Nov. 12, 1963 — E. W. HOFFMEISTER — 3,110,492
JUMPING EQUIPMENT
Filed April 18, 1961 — 5 Sheets-Sheet 1

INVENTOR.
ERNST W. HOFFMEISTER
BY Walter S. Aleston
ATTORNEY

Nov. 12, 1963   E. W. HOFFMEISTER   3,110,492
JUMPING EQUIPMENT
Filed April 18, 1961   5 Sheets-Sheet 4

INVENTOR.
ERNST W. HOFFMEISTER
BY Walter S. Bleston
ATTORNEY

United States Patent Office 3,110,492
Patented Nov. 12, 1963

3,110,492
JUMPING EQUIPMENT
Ernst W. Hoffmeister, 95 Lawton Blvd., Suite 408,
Toronto, Ontario, Canada
Filed Apr. 18, 1961, Ser. No. 103,766
8 Claims. (Cl. 272—70.2)

The present invention relates to jumping equipment, and more particularly to resilient stilts provided with locking means for converting them into rigid stilts.

The application is a continuation-in-part of application Serial No. 830,108, filed July 28, 1959, now patent No. 3,065,962.

Conventional resilient stilts are difficult to mount and to use because of their instability. I have accordingly devised jumping equipment which, for the first time, makes resilient stilts practically useful, the stilts of this invention being readily convertible from resilient to rigid stilts during use, i.e. while mounting them and/or jumping on them.

In resilient stilts, two stilt parts are mounted for relative movement in relation to each other and are interconnected by resilient means, such as pneumatic or spring means, which stores a resilient thrust imparting an upward or forward motion to a person using the stilts.

It is a primary object of the invention to provide such stilts with a locking arrangement whereby the relative movement of the stilt parts may be stopped at any point so that any desired amount of resilient thrust remains stored in the stilt, such locking being releasable at any desired moment.

The locking arrangement preferably comprises a detent pivotally mounted on a sleeve which extends from, and is telescoped over, one end of a support member of each stilt, the support member and sleeve having notch means for engagement with the detent in its locking position. The sleeve preferably has an extensiton of a length designed to reach approximately to the plane of the elbows of a user of a pair of such stilts when the same are in a substantially upright position so that the user may grip the sleeve or an extension thereof with his hand while his forearm is in a generally horizontal position.

In accordance with one embodiment of the invention, the pivotal detent may be released by means extending to the hand grip unit extension and operable by a manual release member mounted at the top of the extension.

According to another embodiment, the release means for the detent comprises a cam movable by the foot of the user for pivoting the detent from a locking into a release position.

Preferably, the sleeve carries a foot support plate comprising a pivotal portion of pedal urged upwardly by a compression spring. The cam is mounted on the pedal and moves therewith. It has a camming edge which is out of contact with the detent when the pedal is flush with the plate and which pivots the detent on upward movement of the pedal into a release position. A spring normally biases the detent into the locking position.

In accordance to another preferred feature, a pair of diametrically opposed guide rollers are mounted on the sleeve and engage the support member during the relative movement of the one toward the other.

According to still another feature, a more secure footing is obtained for the stilt by providing it with an elastic shoe of a rectangular cross section and extending substantially transversely of the direction of forward movement.

I prefer to use as resilient connecting means between the relatively movable stilt parts a rubber tension spring consisting of a plurality of soft rubber lamellae parallel to each other and defining freely accessible air spaces therebetween.

The above and other objects, advantages and features of the present invention will become more apparent from the following description and the accompanying drawing illustrating an embodiment thereof by way of example. In the drawing.

Figures 1, 2:
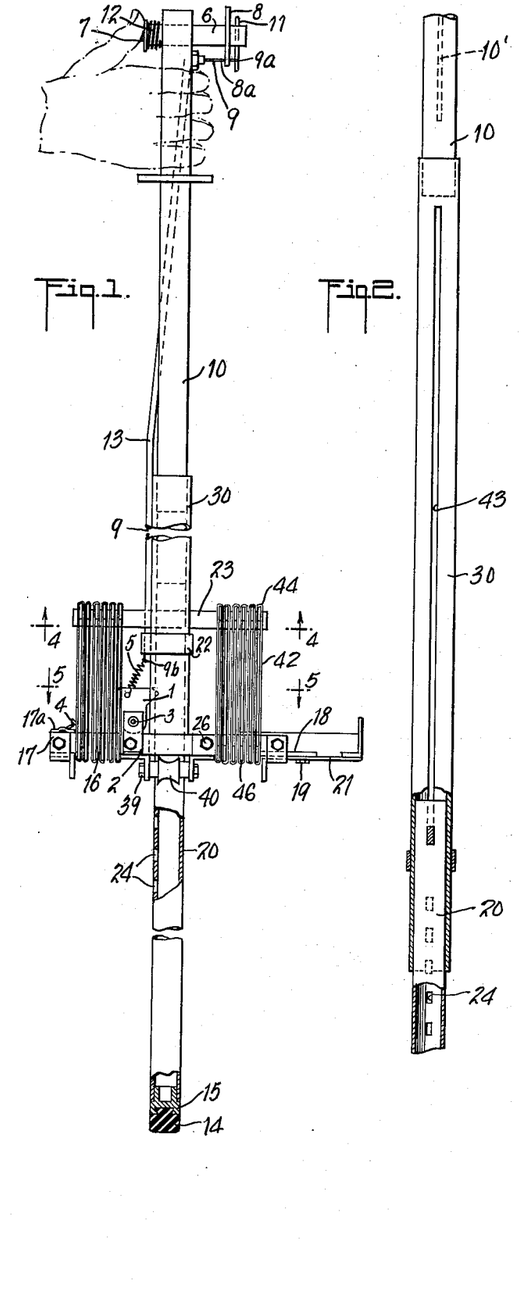
FIG. 1 is a side elevation of a stilt according to the invention, the stilt not being loaded.
FIG. 2 is a front view of FIG. 1 viewed in the direction of arrow 2.
Figure 3:
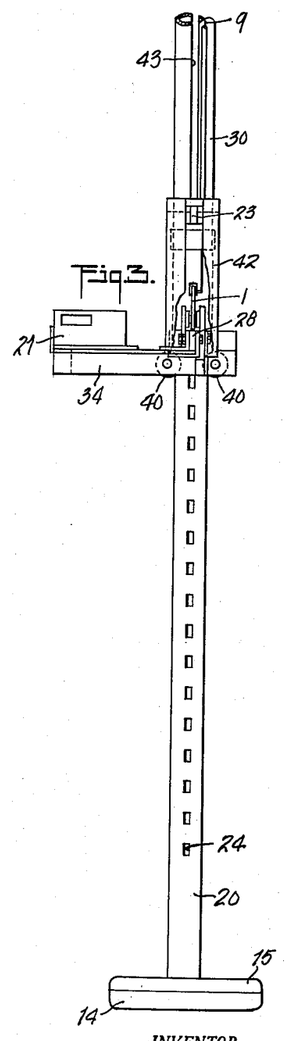
FIG. 3 is a rear view of FIG. 1 viewed in the direction of arrow 3.
Figure 4:
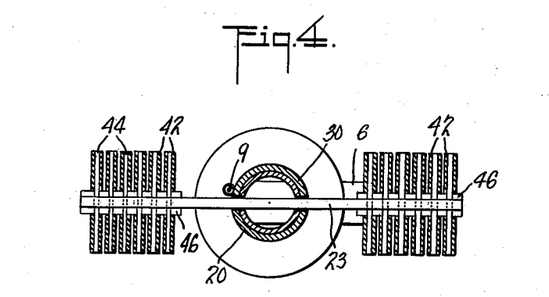
FIG. 4 is a transverse section along line 4—4 of FIG. 1.

Referring now to the drawing, FIGS. 1 to 3 show the right one of a pair of stilts constructed in accordance with the invention, the illustrated jumping device comprising a rod-like member, which is substantially upright when in use and is constituted by a tubular support member 20. Support member 20 has an elastic shoe 14, for instance of rubber, which is clamped into metallic holder 15 which is shown to have a dovetailed recess gripping a correspondingly shaped portion of the shoe and a sleeve in friction engagement with the tubular member 20. Obviously, the sleeve of the holder could also be screwed into the end of the member 20.

The main support member 20 of the stilt is telescoped into sleeve 30 for relative movement in respect thereto, sufficient play being provided between member 20 and sleeve 30 to provide a sliding engagement therebetween. The tubular extension or hand grip member 10 forms a press fit with the upper end of sleeve 30 so as to constitute an integral hand grip unit therewith, which may be longitudinally moved in relation to support member 20.

The longitudinal adjustment between the hand grip unit and the stilt support member is effected in the embodiment of FIGS. 1 to 10 by the following mechanism, as shown in FIG. 1.

The support member 20 has a plurality of longitudinally spaced notch means shown as apertures 24 any one of which may be brought into registry with the nose of pivotal detent 1 to fix the relative longitudinal position of support member 20 and the hand grip unit 10, 30. The detent is pivotal about transverse bolt 3 mounted on bracket bearing 2 and is normally biased into a respective one of apertures 24 by helical tension spring 5. One end of spring 5 is hooked into an eye in detent 1 while its other end is connected to loop 9b of control wire 9. The detent is biased into the opposite direction by helical tension spring 4, which is weaker than spring 5. Spring 4 has one end hooked into loop 1a on the detent and its other end in loop 17a on bracket 17.

At the top of the grip unit, which is considerably longer than the stilt support 20, there is a handle portion wherein actuating release button 6, 7 is mounted. The button comprises a bolt 6 slidable in a transverse bore in tube 10 and a flat disc or thumb piece 7 for ready engagement of the button by the thumb of the user. The thumb piece also serves as the shoulder for a compression spring 12 mounted between the thumb piece and the tube 10 to impart resiliency to the button. Keyed to the bolt 6 at the other side of the tube is a disc 8 having an aperture 8a permitting the wire 9 to pass therethrough. Wire end loop 9a is attached to pin 11 which may be a cotter pin mounted in the bolt.

The wire or cable 9 may be a thin steel double wire or a Bowden pull wire mounted in a Bowden housing 13 whose upper end passes through a transverse bore in the handle portion of tube 10, an oblique intermediate portion passing through the tube and out through a slot 10' in the diametrically opposite side of the tube, and whose lower end passes adjacent to tubes 10 and 30 toward spring 5. The lower end of the wire housing 13 is held in position by a preferably resilient ring or clamping member 22, for instance, a rubber band.

The above-described longitudinal adjustment and locking mechanism of the stilt operates as follows:

When the thumb of the user applies pressure to the thumb piece 7 of bolt 6, wire 9 is pulled upwardly to exert tension on spring 5 and thus to force detent 1 against support member 20 and into locking engagement with any aperture 24 in registry with the nose of the detent, the nose extending through a vertical slot in sleeve 30. When the thumb pressure is released, the tension of pull wire 9 is relaxed since the bolt returns under the pressure of spring 12 and spring 4 pivots the detent 1 out of its locking position into a release position.

Figures 5, 6, 7, 8:
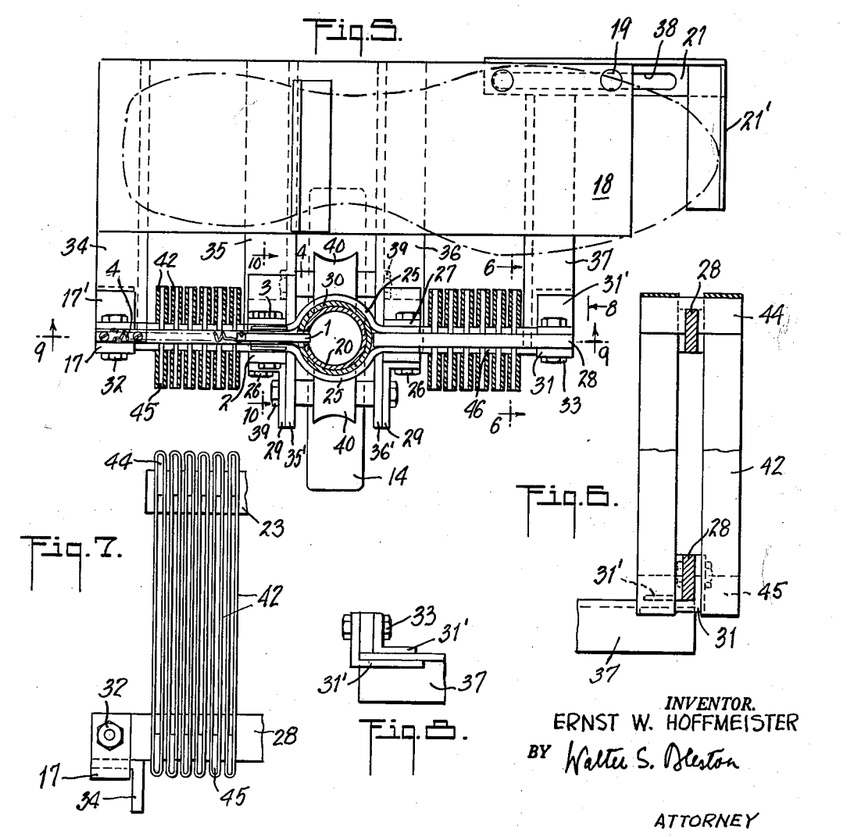
FIG. 5 is a transverse section along line 5—5 of FIG. 1.
FIG. 6 is a section along line 6—6 of FIG. 5.
FIG. 7 is a side view of a portion of FIG. 5 viewed in the direction of arrow 7.
FIG. 8 is a section along line 8—8 of FIG. 5.
Figure 9:
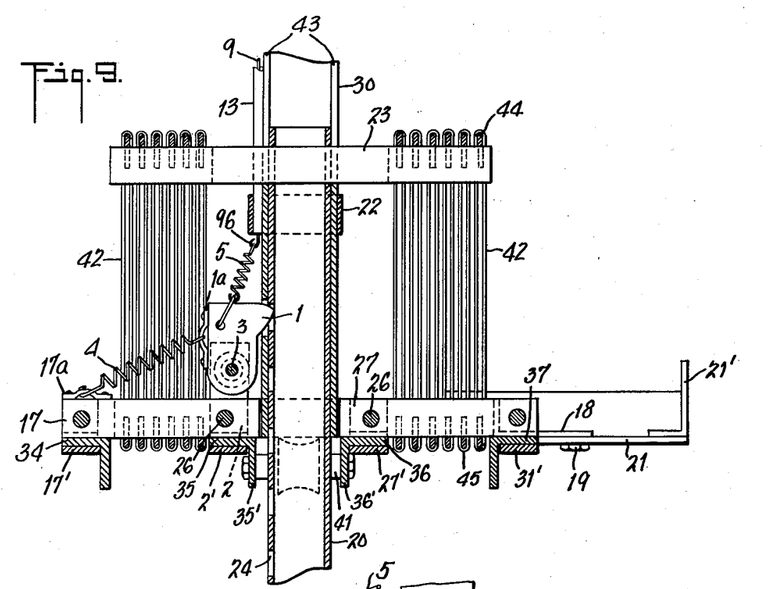
FIG. 9 is a section along line 9—9 of FIG. 5.
Figure 10:
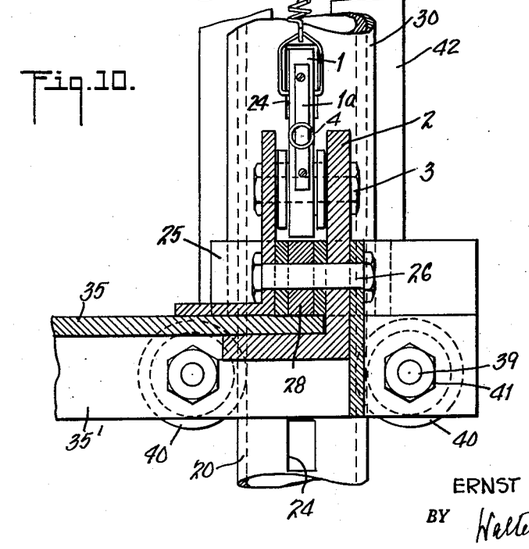
FIG. 10 is a section along line 10—10 of FIG. 5.

A foot support plate 18 is supported on sleeve 30 in a manner to be described hereinafter, the foot support plate being adapted to receive and hold the foot of a user of the stilt, as indicated in a broken outline in FIG. 5, various details being particularly shown in FIGS. 5 to 10.

A pair of clamps 25, 25, with intermediate arcuate portions forming a friction fit with the lower end of sleeve 30, are fixedly mounted on sleeve 30, the end flange of the clamps being connected by a pair of bolts 26, 26. One of the bolts (at the left in FIGS. 5 and 9) passes through, and thus supports two vertically extending legs of the bracket bearing 2 for the pawl 1, while a horizontally extending leg 2' of the bracket is used to support one of the four support members for the foot plate. The other bolt 26 (at the right side of FIGS. 5 and 9) passes through two vertically extending legs of bracket 27 whose horizontally extending leg 27' is used to support another one of the support members for the foot plate. The pairs of vertically extending legs of brackets 2 and 27 form forks which tightly grip the flanges of clamps 25, 25.

The end flanges of clamps 25, 25 define a space therebetween to receive and hold the ends of a pair of horizontally extending support bars 28, 28 which project laterally from sleeve 30. The support bars are firmly held in position in the clamp flanges by bolts 26, 26 which pass through the bars.

Finally, a pair of like angle pieces 29, 29 are clamped to the end flanges of clamps 25, 25 at respective sides of sleeve 30, with one of the legs of the angle pieces being clamped between the heads of the bolts 26 and one of the vertically extending legs of brackets 2 and 27, with the bolts passing through this leg of the angle pieces.

At their outer ends, the support bars 28, 28 carry brackets 17 and 31, respectively, each bracket having two vertically extending legs forming forks which tightly grip the support bars and are fixed thereto by respective bolts 32 and 33 which pass through the vertically extending bracket legs and the support bars. Each of the brackets 17 and 31 also has a horizontally extending leg 17' and 31', respectively, for supporting two respective ones of the four support members for the foot support plate.

The foot support plate support members 34, 35, 36 and 37 extend perpendicularly from one side of the support bars 28, a pair of support members being carried by each bar 28 at either side of the sleeve 30. Each support member has a horizontally extending leg which is carried by, and riveted to, a respective one of the horizontal legs of brackets 17, 2, 27 and 31. The plate 18 is carried by, and riveted to, the four horizontally extending legs of its support members and has mounted at the forward end near one longitudinal edge two set screws 19, 19 in sliding engagement with a longitudinal slot 38 in sliding member 21. Adjustment of the sliding member along slot 35 permits the foot plate 18 to be used with various shoe sizes, a vertically extending forward edge 21' being provided on the sliding member to hold the foot in position on the foot support plate.

The foot plate support members are angle pieces having vertically legs perpendicular to the horizontal legs to which the foot plate is riveted. As best shown in FIG. 5, the vertical legs 35' and 36' of support members 35 and 36, respectively, extend beyond one edge of the horizontal legs of these support members, these vertical legs forming a bearing for a pair of pivot bolts 39, 39 upon which rollers 40, 40 are freely rotatable. Spacing sleeves 41, 41 surround each pivot bolt, the spacing sleeves abutting the vertical legs 35', 36'. The extensions of the vertical legs 35', 36' are riveted to the other legs of angle pieces 29, 29 for added support, the pivot bolts 39 passing through the other legs of the angle pieces 29.

The rollers 40 have arcuate surfaces engaging the tubular support member 20 at diametrically opposite sides thereof so as to constitute a sliding guide for the vertical movement of the sleeve 30 on support member 20 when the locking arrangement constituted by detent or pawl 1 and apertures 24 is disengaged.

The support member 20 and the sleeve 30, which forms part of the hand grip unit of the stilt, are interconnected by resilient means. The support bars 28, which are fixedly mounted on sleeve 30, serve to hold the lower ends of resilient elements 42 while their upper ends are held by a cross support bar 23 which is fixedly mounted on a transverse bearing in the upper end of tubular support member 20. The cross bar 23 passes through diametrically opposed longitudinal slots 43 in sleeve 30 (see FIG. 2) to permit it to be vertically reciprocated in relation to the sleeve. The relative vertical position of support member 20 and the hand grip unit 30, 10 of the stilt is fixed when the pawl 1 engages an aperture 24 and thus locks the stilt and makes it rigid. This relative vertical position determines the tension of the resilient elements 42 and, thus, the thrust stored in the stilt and released upon release of the locking engagement.

As more fully explained in my copending application Serial No. 830,108, filed July 28, 1959, now Patent No. 3,065,962, I have found that in jumping equipment of practically all kinds and especially in stilts herein described, conventional metal springs are not satisfactory, considering their weight and their relatively low effectiveness. The spring arrangement I use consists of a plurality of thin soft rubber lamellae mounted on bars 23 and 28, respectively. The lamellae may be vulcanized natural or synthetic rubber or rubber-like materials of like resilient properties. In the illustrated embodiment, they consist of endless rubber bands engaged by bars 23 and 28, and spaced apart to define freely accessible air spaces therebetween. The soft rubber bands 42 operate as tension springs and the following calculations and experiments will illustrate the advantage of this arrangement:

It may be assumed that for a pair of jumping stilts according to my invention, the weight of the user, i.e. an up and down swinging, bouncing or jumping person is 95 lbs., the maximum jumping or dropping height 1 foot above the level of the non-loaded foot support, and the height of the non-loaded foot support 6 inches above the ground, or more exactly, above the buffer at the foot of the device, which height is the distance the support is permitted to be shifted downwards due to the impact of the bouncing or jumping person. If conventional steel coil springs are considered, then for checking or for elastically return springing or recoiling of 95 lbs. from 1 foot dropping height plus the corresponding deflection of 6 inches, a battery of e.g. 12 parallel coil springs would be necessary for each leg, each spring with 100 convolutions of round steel wire, gage No. 11 (.121" dia.) and ¾ inch outer coil diameter having a weight of 9 lbs. That means, the user would have to carry along 18 lbs. Steel springs of other dimensions for the same effect would be similarly weighty and cumbersome.

If, contrary thereto, according to the invention, a soft rubber tension spring is used for the same purpose and result as hereinbefore stated, the rubber material being e.g. one ordinarily on the market, then the spring may have a cross-section of 1.113 sq. in. with a working length of 1.5 in. Adding thereto the length of 2 times 1 in. for the attachment of the spring by clamping, the total length of the rubber is 3.5 in. Thus, the rubber spring for one leg has a volume of 3.89 cubic in. with a weight of .48 ounce per cubic inch or a total of 1.81 ounces. That means, the total spring weight to be carried by the user is only about 3¾ ounces. If higher efficiency is required, the superiority of the rubber tension spring over a steel spring becomes still more convincing. Thus, for a weight of the user of 160 lbs. and a jumping height of 2 feet with 6 in. clearance of the foot support from the ground, calculation gives the weight of steel springs as about 63.56 lbs., there being required for each leg a battery of 16 springs of a wire #9 (.148" dia.) wound to form a coil of ⅞" dia. and 150 convolutions. Contrary thereto, the soft rubber tension springs of equal efficiency would require each a cross-section of 1.69 sq. in., and a total length composed of the working length of 1.5 in., plus two clamping ends of 1 in., each which may be necessary, i.e. a volume of 1.69×3.5=5.9 cu. in. Hence, the weight of both springs would run up only to 2×.48×5.9=5.68 ounces. This surprisingly high superiority of rubber tension spring over the steel spring as to weight and bulk renders it possible to reach heights of jumps with my jumping stilts which are practically not attainable with any conventional jumping stick or similar jumping equipment.

Of course, I do not claim that a rubber spring according to my invention is a proper substitute for steel springs in all sorts of machinery. This is not so because rubber is subject to deterioration by the action of many substances, media and external influences. Where, however, such effects do not occur or are of no or minor importance, the rubber tension spring particularly in its hereinafter described specific form is extremely valuable. This high value results from various remarkable properties of the rubber, of which I have fully made use in my jumping equipment. First of all, conventional rubber approximately of the quality of rubber bands as ordinarily on the market has a capacity of storing a static load about 153 times higher than spring steel, according to "Engineering With Rubber," by Walter S. Burton—McGraw-Hill Book Co., Inc.—New York, 1949, p. 18. In fact, the capacity of storing shock or impact energy increases in rubber with the speed of the applied load, e.g. with the height of a fall or jump. This is again contrary to the behavior of steel where the impact storing energy is constant, i.e. independent of the speed with which the load is applied. The changeability of the energy storing capacity of the rubber under impact loads with the speed of the impacting body is an essential factor in the proper dimensioning of a rubber spring for the purpose of the present invention. If, e.g. it is desired, as in the present case, not to exceed an elongation of 400% in order to allow for a high factor of safety or for other reasons, the dimensioning need only to consider the dynamic load and may neglect the static load of the impacting body, as the static load would seem to require much larger cross-sections without sufficiently taking the elasticity of the rubber into account. Thus, comparing a rubber spring and a steel tension spring substantially of rod form and of equal dimensions, i.e. equal cross-section and equal loaded length, the capacity of the rubber spring may be hundreds of times higher than that of the steel spring when the latter is loaded up to the elastic limit. The necessary cross-section and length of a suitable rubber spring can be found by trial or calculation provided the properties and behavior of the rubber used are known. In the present case the dimensions of the examples given hereinbefore have been determined by me in experiments. The stated values have been ascertained under impact load for a maximum elongation of 400% which corresponds to the height of the foot support above the buffer at the lower end of the device. The maximum length of the spring is then determined for the illustrated embodiment in view of the 400% elongation as one-fourth of the distance between the lower end of the tube 30 and the buffer 14. In figuring the mentioned distance it may be considered that there will occur a remaining elongation of the spring which, however, is so small, about .3 to .5% of the total maximum elongation that it may be neglected.

The length of the spring has quite an influence on its behavior. This should be duly considered. First of all, an increase of the length of the spring tends to decrease losses due to the hysteresis of the rubber to which special reference will be had later on, and consequently to increase the restoring energy of the spring. By selecting a longer spring which, of course, means enlarging the length of the active portion of the spring which is subject to the elongation under load, the duration or period of the spring oscillations can be increased. Whereas the total cross-section of a rubber spring should be so dimensioned that under the maximum impacting force the elongation of the spring does not exceed a selected measure, say 400% for safety reasons in view of occurring fatigue, the length of the non-loaded spring may be varied, but only so far that the maximum elongation remains below the desired maximum jumping height. However, the height of the non-loaded foot support must correspond to the maximum elongation, e.g. 400% of the desired original length even if that length is increased. The length of the spring is also a decisive factor with respect to the capacity of storing energy if impact effects are concerned. Quite in general, an increase of the spring length may become advisable in order to render the spring softer, to increase the period of oscillation which is proportional to the square root of the elongation and, furthermore, to decrease the impact impulse on the spring and to decrease also the distance a falling body has to travel before the tensioning of the spring sets in. In consequence of such increased length, the hysteresis becomes also smaller and the recovery of energy becomes greater. Hence, the muscular impulses of the user will be better stored and the efficiency of the muscular force required for the upswinging will be higher.

There is the property already mentioned of vulcanized soft rubber which must be taken well into consideration as it does not permit to utilize the total capacity of storing energy which renders the rubber so vastly superior to steel when used as a tension spring. This is the aforementioned hysteresis which is caused by the heating up owing to the molecular friction originating from the tensioning and the resulting elongation of the rubber. The hysteresis, i.e. the elongation of the rubber remaining after the tensioning load is removed, disappears after a certain time. An effect of the hysteresis becomes apparent by the fact that the time during the rising will be longer than during the fall of the loading body. The hysteresis which dampens the shock of the falling body, reduces the recoil energy when the load bounces up and down. It is not of the same quantity in different kinds of rubber. For instance, it is higher in the conventional rubber bands than in the better qualities as e.g. used in the tubes or even still higher than in the rubber of tires. It has been stated that the length of the spring has an effect on the hysteresis. In fact, for the same impulse energy shorter springs become warmer than longer springs. Otherwise expressed, the recoverable energy accumulation and thus the spring force increases with the length of the spring, though not in proportion thereto.

In any event, in order to reduce the drawback, i.e. the loss in potential energy resulting from the hysteresis, I construct rubber tension springs according to my invention in such a manner that an automatic cooling occurs during the alternating tensioning and relaxing of the rubber spring whereby the hysteresis will be reduced. Although the hysteresis cannot be entirely eliminated, it or its effect can be kept in such limits if my invention is applied that even the relatively poor quality of conventional rubber bands is useful in my jumping equipment with very satisfactory results. For this purpose, I first calculate or otherwise find by experiment the proper area of cross-section which in the foregoing example was e.g. 1.113 sq. in. Considering that the heat due to molecular friction in the rubber increases within limits with the thickness of the rubber spring, I subdivide the cross-section in thin strips, that means, I construct the spring of a plurality of thin lamellae. A spring of the mentioned cross-section may be composed e.g. of 24 lamellae, each having a thickness of .0625 in. and a width of .75 in., giving a total cross-sectional area of 1.125 sq. in. I do not recommend the use of lamellae or bands of a smaller thickness than .0625 in. because below a certain thickness the elastic property of rubber diminishes. Furthermore, I have found that the ratio of width to thickness may be selected between 16 and 1. If this ratio is higher than 16, the bands tear easily under load.

The division of the total cross-section of a rubber tension spring into a plurality of lamellae is a first measure to reduce the hysteresis as thereby the molecular friction will be reduced and, consequently, less heat will be created. A further very effective means is the arrangement of the lamellae with air spaces therebetween. These spaces may be of a width similar to the thickness of the individual lamellae or even larger. The air between two adjacent lamellae will then have a cooling effect. This effect will be increased during the alternating tensioning and relaxing of the spring as in consequence of the repeated elongation and contraction, the thickness of the lamellae will alternatingly decrease and increase and the air spaces will accordingly increase and decrease in width. Thus, a certain breathing takes place whereby the cooling air of the air spaces will be at least partly renewed upon the operation of the spring. Whereas the hysteresis loss may rise to 30 or even 40% in an ordinary rubber spring of a solid cross-section, it can be greatly reduced by selecting a higher grade soft rubber mixture material and, furthermore, by designing the spring according to my invention. Thus, I have found that by laminating a rubber spring and spacing the lamellae from one another it is possible to reduce the hysteresis, otherwise occurring in any rubber mixture material of solid cross-section, by as much as 50% or even more.

In the illustrated embodiment, the resilient connecting means between support member 20 and hand grip unit 30, 10 of the jumping stilt is shown to consist of two like sets of rubber lamellae 42 arranged at diametrically opposite sides of the sleeve 30 in the direction of the foot support plate 18. The ends of the rubber lamellae are looped about rounded spacers 44, 45 which are mounted on and extend upwardly and downwardly, respectively, from bars 23 and 28. Washers 46 are mounted on bars 23 and 28 between the spacers 44, 45 to maintain their spacing and rigidity under a load.

In use, a person will take two stilts as hereinabove described and place his feet on the respective foot support plates 18 of each stilt, holding onto the hand grips of the stilts with his hands, as indicated in FIG. 1. As the person mounts the stilts, his balance will be assured by operating the locking arrangement of the present invention, whereby the support member 20 of the stilts and the hand grip unit are fixed in relation to each other, thus eliminating the resiliency between the two telescoped parts of the stilt. Thus, when the two parts are locked against relative vertical movement, the stilts become vertically rigid units.

In accordance with the embodiment of FIGS. 1 to 10, the pawl 1 will automatically tend to be disengaged from the vertically spaced apertures of support member 20 under the tension of spring 4, whereby sleeve 30 will resiliently ride on member 20 under the tension of resilient means 42. When the user's thumb depresses bolt 6 in the handle portion of the grip unit, the wire 9 is pulled and sufficiently tensions the spring 5 attached to its end to overcome the bias of spring 4, thus forcing the pivotal detent 1 into engagement with an aperture 24 in member 20. The user will maintain the bolt in depressed position until he is properly balanced on the stilts and at any other time during jumping when he tends to lose balance. Upon release of the bolt, the weight of the user will be equally distributed among both stilts, each resilient means connecting the support member with the hand grip unit of each stilt supporting half the user's weight, which will produce a vertical rocking motion. His hands will grip the handle portion so that the stilts remain generally upright. To start a jump, the user will now shift his whole weight to one of his legs, which will relax the resilient means on the stilt supporting the other leg and tend to lift the other leg. Simultaneously, the one leg will weigh down more heavily on the one stilt and further tension its resilient means. Thereupon, the user's whole weight will be shifted by a jumping movement from the one to the other leg, which movement will be reinforced by the bias of the sudden relaxation of the tensioned resilient means of the one stilt so that the full weight of the user will come down upon the resilient means of the other stilt with a shock-like downward thrust. As the weight is shifted from stilt to stilt and the tension of the resilient means increases with each thrust, the jumping height will correspondingly increase commensurately with the resilient means tension of the loaded stilt, which tension becomes increasingly greater with the increased height of the jumps and the correspondingly increasing downward thrust imparted to the foot plate by the fall of the user's weight thereon.

It is also possible to use the stilts by jumping up and down on both stilts simultaneously or to effect kangaroo-like jumps in a manner known per se.

It will be noted that, in contrast to conventional jumping stilts, I do not propose to strap the user's legs to the stilts, which experiments have shown to be disadvantageous. Since this lack of strapping would make a secure footing of the user on the stilts difficult, I have extended the hand grip unit upwardly by means of tube 10 so that the handle portion of the stilt reaches high enough to enable the user to hold it with his forearm in approximately horizontal position. This upward extension of the hand grip unit has three advantages:

(1) It will enable the user firmly to hold the stilts and prevent them from tilting over when the feet are placed on the foot support plates.

(2) It will enable the user to use his arm muscles as well as his leg muscles during jumping by pressing the hand grip unit downwardly and thus increase the tension of the resilient means.

(3) It will increase the balance of the user on the stilts, particularly during kangaroo-like jumps, for instance.

By operating the locking arrangement to determine the relative vertical positioning between the hand grip unit and the support member 20, the tension of the resilient connecting means between them and, thus, the built-in thrust of the stilt may be predetermined. This releasable locking arrangement for the first time makes resilient stilts practically operable. Without it, it is not possible for a person freely to mount, and to stand on, vertically oscillating stilts. Furthermore, it is impossible to obtain the necessary initial momentum for jumping on such stilts. However, by locking the telescoping parts of the stilts while mounting them and by predetermining the initial tension and resultant thrust of the resilient connecting means of the telescoping parts, the person using the stilts will be ready for jumping from a secure standing position upon release of the locking arrangement. In this respect, it will be obvious to those skilled in the art that the specific nature of the locking arrangement is of no importance and that many variations thereof will readily occur to the ordinary mechanic, the only requirement being that the locking arrangement be effective to fix the hand grip unit and its support member relative to each other and to be releasable to enable the hand grip unit and the support member to move vertically in relation to each other.

The high tension of the resilient connecting means between the support member and the hand grip unit so strongly presses the support member against the ground that the resultant high friction prevents a lateral movement of the support member footing, thus further securing the stilts in position. This high tension of the connecting means is obtained in the locked position by choosing a proper tension at which the telescoping stilt parts are locked and, in the unlocked position, by the weight of the person standing on the stilts. This adds to the perfect balancing obtainable with resilient stilts only when they are provided with a locking arrangement.

To facilitate the handling of the resilient stilts and to obviate a turning movement of the stilts about their longitudinal axis, the rubber shoe 14 on the stilt support member is rectangular, the longer sides of the rectangular shoe being transversely perpendicular to the direction of the forward movement while its shorter sides, which extend in the direction of this movement, are preferably not, or not much, longer than the diameter of the support member 20. The edges of the rectangular rubber shoe in contact with the ground are preferably rounded.

Friction between the telescoping stilt parts during their relative vertical movement is reduced by the rollers 40 which engage and glide over the support member 20. These rollers are preferably made of vulcanized or other compressed fibrous material, such as used for noiseless ratchet mechanisms.

It is obvious that the telescoping stilt parts, while illustrated to be of circular cross-section, may have any desired cross-section, such as rectangular, polygonal or the like. It is also possible to make the stilts relatively light by using apertured sheet material and/or tubes for the various parts of the stilts.

In FIGS. 1 to 10, a hand-operated locking arrangement has been illustrated, it being obvious that many variations and modifications in such hand-operated locking arrangements between telescoping stilt parts are possible. The only essential point being the provision of a locking arrangement, it may in many instances be desirable to make such an arrangement foot-operated. Here again, a variety of mechanical means may be used to obtain the desired releasable locking of the telescoping stilt parts and FIGS. 11 to 15 illustrate one preferred embodiment of such a foot-operated locking arrangement which takes advantage of the following operating conditions:

In jumping on resilient stilts of the type herein disclosed, a person will automatically lift his heels off the foot support plate and rest his weight with bent knees on the forward portion of his feet, which naturally facilitates an elastic rocking motion of the body. Since jumping requires the hand grip unit freely to move up and down on the support member of the stilt, this lifting of the heel is utilized to release the locking arrangement in accordance with the illustrated embodiment thereof.

In this embodiment, locking is effected automatically when the heel of the user presses flat against the foot support plate while it is automatically released upon lifting of the heel.

Thus, in the normal use of the stilts, as the person mounts the stilts, his feet will press down with their heels on the foot support plate and will automatically actuate the locking arrangement so as to make the connection between the support member and the telescoping hand grip unit of the stilt rigid, eliminating the resiliency of the stilt. As he lifts his heels, the locking arrangement will be automatically released and the stilts are converted into resilient stilts. This makes it possible to lock and release the locking arrangement not only at the beginning of the use of the stilts, i.e. when a person mounts the stilts, but also during jumping to convert the resilient into fixed stilts at any desired length of the stilts.

Referring now to FIGS. 11 to 15, all stilt parts without reference numeral or designated by the same reference numeral as in FIGS. 1 to 10 are identical with the embodiment of FIGS. 1 to 10, the only difference actually being the locking arrangement which is foot-operated in the modification of FIGS. 11 to 15, while it is hand-operated in the stilt shown in FIGS. 1 to 10.

Figure 11:
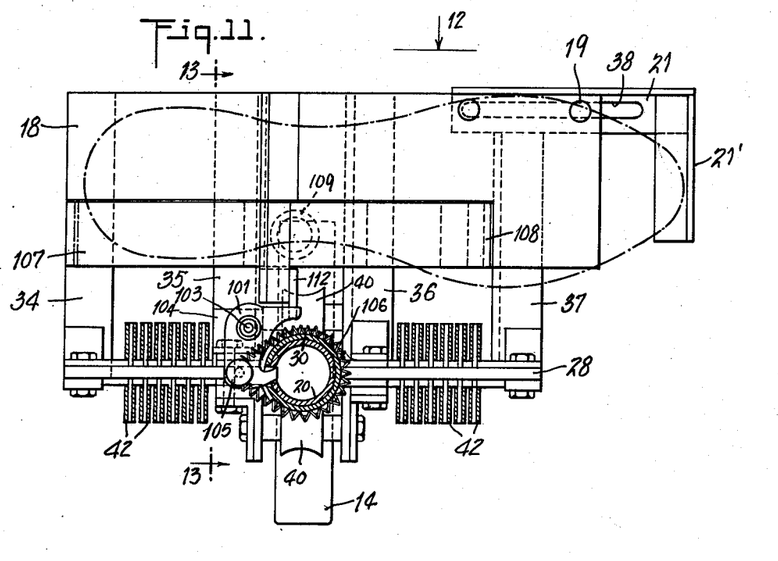
FIG. 11 is a view similar to FIG. 5 but showing a modification of the releasable locking mechanism of the stilt.
Figure 12:
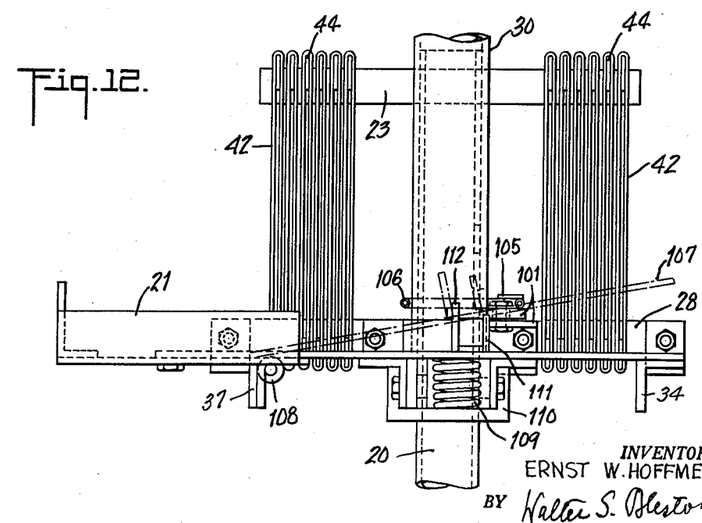
FIG. 12 is a partial side elevation of FIG. 11, viewed in the direction of arrow 12.

Similar in mounting and operation to detent or pawl 1, there is provided the pivotal detent 101 mounted on bolt 103 in a bracket constituted by an angle piece whose horizontal leg 104 supports the double-acting pawl 101, for pivotal movement in a horizontal plane. A pin 105 with a flanged head is fixed to the pawl 101 spaced from the pivot of the pawl and serves as an anchor for an endless tension spring 106 which engages the sleeve 30 of the gripping unit. This tension spring biases the pawl so about its pivot that one of its noses engages a registering aperture 24 in the stilt support member 20 whereby the telscoping stilt parts are locked in position against relative movement.

The foot support plate 18 has a longitudinally extending cut-out accommodating a strip 107 which is hingedly connected at its forward end 108 to the foot support plate so that its rear end may be upwardly moved by compression spring 109. The hinge connection of the strip 107 is effected in the illustrated embodiment with a hinge having one part fixed to the strip while its other part is fixed to the foot plate support bar 37. A U-shaped housing 110 for compression spring 109 is fixed to the foot plate support bars 35 and 36 and holds the spring below the strip 107. The bias of the compression spring 109 exceeds that of the tension spring 106.

Figure 13:
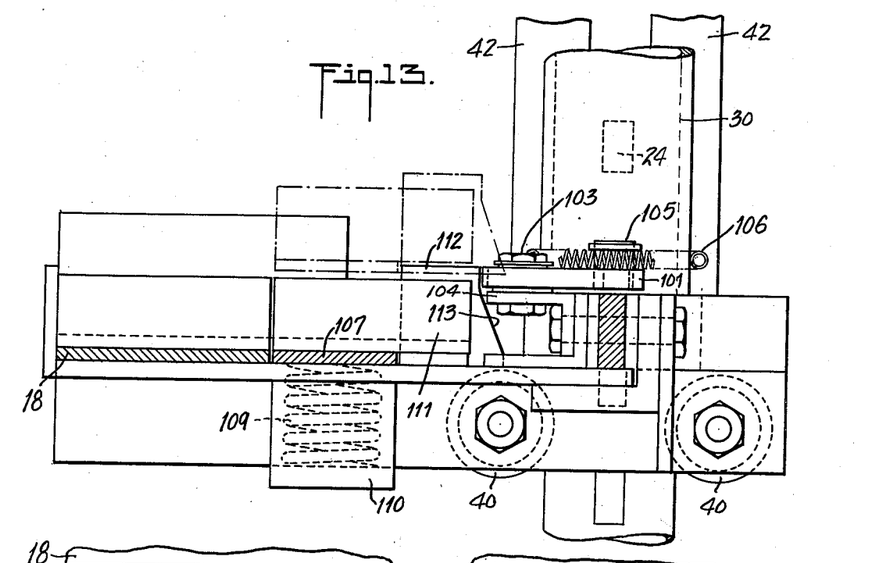
FIG. 13 is a section along line 13—13 of FIG. 11.
Figure 14:
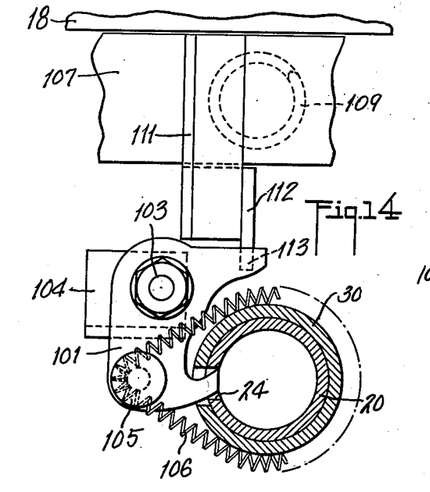
FIG. 14 is an enlarged view of the detent of FIG. 11 in locked position.
Figure 15:
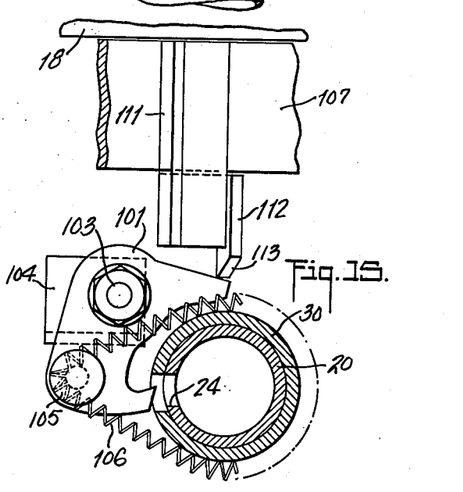
FIG. 15 is similar to FIG. 14 but showing the detent in released position.

The upwardly pivotal strip or pedal 107 carries a vertically extending plate 111 which may, for instance, be riveted to the strip 107 and moves with it, the plate 111 extending toward the stilt support member and carrying the cam 112. The camming edge 113 of cam 112 extends vertically obliquely away from the axis of the stilt. As best shown in FIG. 13, when the pedal 107 is flat in a plane with the foot support plate 18, i.e. when the heel depresses the pedal against the bias of spring 109, the upper portion of the camming edge 113 clears the pawl 101 whereby the tension spring 106 biases the pawl into a registering aperture 24, thus locking the telescoping stilt parts. When the heel is lifted, compression spring 109, whose bias exceeds the tension of spring 106, will lift the pedal 107 and with it, cam 112, thus moving the lower projecting part of camming edge 113 against the other nose of pawl 101 and pivoting the pawl against the bias of spring 106 out of the aperture 24, thereby releasing the lock and making the stilt resilient under the action of spring elements 42. In this manner, an exceedingly simple, reliable and automatically acting locking and releasing mechanism is obtained whereby the stilts are converted from rigid to resilient stilts during the natural use of the equipment.

While I have particularly described two specific embodiments of the present invention, it will be clearly understood that many variations and modifications may occur to the skilled in the art without departing from the spirit and scope of the invention as defined in the appended claims.

I claim:

1. In jumping equipment: an elongated support member: an elongated hand grip unit comprising a sleeve extending from, and telescoped over, one end of said support member and being in sliding engagement therewith for relative movement between the support member and the sleeve, and an extension fixed to said sleeve and of a length designed to reach approximately to the plane of the elbows of a user of the jumping equipment when the same is in a substantially upright position: resilient means between the sleeve and the support member, respectively, to provide a resilient connection therebetween: a foot support plate secured to the lower end of said sleeve: a locking detent pivotally mounted on the sleeve for engagement with registering notch means provided along the length of the support member for locking the sleeve against said relative movement in relation to the support member, said detent being a double-acting pawl pivoting in a horizontal plane and a spring means being provided for biasing one nose of the pawl into said engagement: and a foot-operated means for releasing said pawl nose from the locking engagement whereby the resilient means causes the hand grip unit and the support member to move resiliently relative to each other, said releasing means comprising a pedal pivotally mounted on the foot support plate, compression spring urging the pedal upwardly from the plane of said plate in the absence of counter-pressure, and a cam fixedly mounted on said pedal and moving therewith, the cam having a camming edge out of contact with the pawl when the pedal is flush with the plate and pivoting the pawl nose against the bias of said spring means into a release position on upward motion of the pedal.

2. In the jumping equipment of claim 1, said spring means being an endless spring looped about said hand grip unit and engaging said pawl, the bias of the compression spring exceeding the bias of the spring means.

3. In the jumping equipment of claim 1, the compression spring being a coil spring having an axis perpendicular to the pivoting plane of the pawl, a housing being mounted on the foot support plate and below the pedal for holding said coil spring.

4. In the jumping equipment of claim 1, the camming edge extending vertically obliquely away from the axis of the hand grip unit, the camming edge being adapted to move toward the other nose of the pawl upon said upward motion.

5. In the jumping equipment of claim 1, an elastic shoe mounted on the other end of the support member, said shoe having a rectangular cross section and extending substantially perpendicularly to the foot support plate.

6. In the jumping equipment of claim 1, a pair of diametrically opposed rollers mounted on the hand grip unit and engaging the support member during said relative movement.

7. In the jumping equipment of claim 1, wherein said resilient means is a rubber tension spring secured, respectively, to the hand grip unit and to the support member to provide a resilient connection therebetween, said spring comprising a plurality of soft rubber lamellae parallel to each other and defining freely accessible air spaces therebetween, spacing means holding the respective ends of the lamellae spaced apart.

8. In jumping equipment, in combination:
   (a) an elongated support member;
   (b) an elongated grip unit extending from, and mounted on, one end of said support member and being in sliding engagement therewith for relative movement between the support member and the hand grip unit, said unit comprising
      (1) a sleeve extending from, and telescoped over, said one end of said support member, and
      (2) an extension fixed to said sleeve and of a length designed to reach approximately to the place of the elbows of a user of the jumping equipment when the same is in a substantially upright position;
   (c) a rubber tension spring secured, respectively, to the hand grip unit and to the support member to provide a resilient connection therebetween said spring comprising a plurality of soft rubber lamellae parallel to each other and defining freely accessible air spaces therebetween;
   (d) spacing means holding the respective ends of the lamellae spaced apart;
   (e) a locking arrangement for securing the hand grip unit and the support member against said relative movement, said locking arrangement comprising a detent pivotally mounted on the sleeve for engagement with registering notch means provided along the length of the support member; and
   (f) means for releasing said locking arrangement, said releasing means being connected to said detent, and comprising a cam movable by the foot of the user for pivoting the detent from a locking into a release position, whereby the rubber tension spring causes the hand grip unit and the support member to move resiliently relative to each other.

References Cited in the file of this patent

UNITED STATES PATENTS

| | | |
|---|---|---|
| 238,042 | Herrington | Feb. 22, 1881 |
| 1,547,024 | Byrne et al. | July 21, 1925 |
| 2,057,013 | Curtis | Oct. 13, 1936 |
| 2,705,637 | Hranicka | Apr. 5, 1955 |
| 2,783,997 | Gaffney et al. | Mar. 5, 1957 |
| 2,837,335 | Koenig | June 3, 1958 |
| 2,899,685 | De Carbon | Aug. 18, 1959 |